United States Patent [19]

Snyder

[11] Patent Number: 4,843,990

[45] Date of Patent: Jul. 4, 1989

[54] RETAINER FOR MARINE DRIVE STEERING LINKAGE

[75] Inventor: Richard H. Snyder, Oshkosh, Wis.

[73] Assignee: Brunswick Corporation, Skokie, Ill.

[21] Appl. No.: 142,065

[22] Filed: Jan. 11, 1988

[51] Int. Cl.$^4$ ............................................. B63H 21/26
[52] U.S. Cl. .................................. 440/61; 114/144 R; 24/453
[58] Field of Search ................. 440/53, 61, 62, 63; 403/70, 163, 154, 329; 24/453, 616, 297, 295, 293; 280/515; 474/218, 227, 228; 74/99 R; 114/144 R

[56] References Cited

U.S. PATENT DOCUMENTS 3,122,386  2/1964  Pearson .............................. 403/163
4,416,636 11/1983  Boda ................................... 440/63

FOREIGN PATENT DOCUMENTS 236668  1/1960  Australia .............................. 24/295
698737 10/1953  United Kingdom ................ 24/453

Primary Examiner—Sherman D. Basinger
Assistant Examiner—Edwin L. Swinehart
Attorney, Agent, or Firm—Andrus, Sceales, Starke & Sawall

[57] ABSTRACT

The rotatable connection between the steering link rod and the cable output ram in a marine drive steering linkage includes a demountable retainer which provides positive retention of the connection and manual assembly and disassembly thereof without the use of tools. The retainer is attached to the link rod thereby precluding the loss or improper substitution of component parts.

8 Claims, 1 Drawing Sheet

U.S. Patent  Jul. 4, 1989  4,843,990

RETAINER FOR MARINE DRIVE STEERING LINKAGE

BACKGROUND OF THE INVENTION

The present invention relates to marine drive steering systems and, more particularly, to a demountable retainer for interconnecting key components of the steering linkage.

In both stern drive and outboard marine engines, a commonly utilized steering system includes a cable-driven ram to operate the drive steering arm. In a common arrangement, the ram and steering arm are interconnected by a link rod which includes a short right angled end portion rotatably secured in an aperture at the end of the ram. In an alternate arrangement, the ram and link rod may be interconnected by a lost motion ram link in a similar manner.

Examples of such steering linkage connections are shown in U.S. Pat. Nos. 4,349,341, 4,362,515, 4,416,636 and 4,482,331.

The short right angled end portion of the link rod is generally provided with an annular shoulder and reduced diameter threaded end. The end is inserted through an aperture in the end of the ram (or interposed lost motion ram link) and secured in place with a self-locking nut. The lock nut allows relative rotation in between the parts and is intended to maintain the linkage if the engine is tilted or the linkage is otherwise subjected to a force tending to displace it from its operative position, such as the usual bumping or jarring incurred in the operation of a boat. The loads imposed on the lock nut are, in any event, typically not large and its function is primarily to retain the interconnection of the steering linkage components. In place of the self-locking nut, a nut or other threaded fastener utilizing a cotter pin is also sometimes used.

The steering linkage must occasionally be disconnected, particularly in an outboard motor application when the motor is removed from the boat. The output ram-link arm connection is a convenient point for disconnection.

However, boat owners or operators may not appreciate the locking function provided by the fastening assembly furnished with the original construction. Thus, as a result of subsequent disassembly, the reassembly of the connection may be made improperly. For example, the original self-locking nut may be replaced by a simple non-locking nut or other threaded fastener, or a cotter pin may be left out in the reassembly. In any event, vibration of the improperly reassembled connection can cause the simple threaded fastener to come off and subject the steering linkage to inadvertant disconnection.

Thus, a more fool-proof connection and retaining assembly would be desirable which would preclude the use of improper substitute fasteners. Further, it would also be desirable to have a connection assembly which provides positive retention, but can be assembled and disassembled without the use of tools.

SUMMARY OF THE INVENTION

The present invention is directed to an improved connector assembly for demountably retaining the end of a link rod for a marine drive steering system within the aperture of the steering output ram (or ram link) which allows the necessary relative rotation but positively secures the connection against inadvertent disassembly. The connector assembly is fixed to the end of the link rod and the linkage may be connected and disconnected manually without the use of tools.

In the preferred embodiment of the invention, a pair of leaf springs are attached to the end of the link rod and extend axially along the rod and diverge radially therefrom to their free ends. Insertion of the end of the link rod into the aperture in the output ram causes radial inward deflection of the free ends of the leaf springs and allows them to pass through the aperture, whereupon they spring back radially outward from the link rod to bear on one face of the ram for positive retention. For disassembly the leaf springs are squeezed manually together (radially toward the rod axis) to allow withdrawal of the link rod axially from the aperture.

DETAILED DESCRIPTION OF THE PREFERRED EMBODIMENTS

Figure 1:
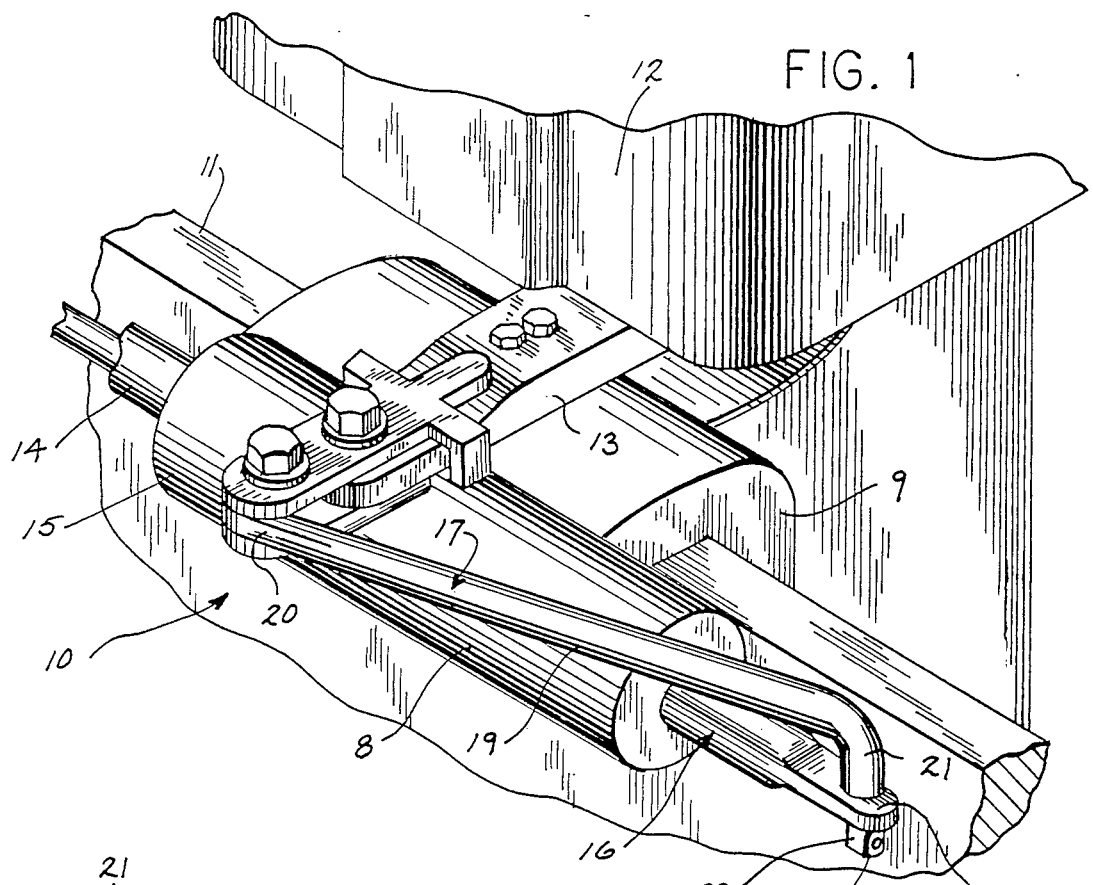
FIG. 1 is a perspective view of a portion of an outboard motor steering system showing the interconnection between the output ram and the link rod utilizing the integral demountable connector assembly of the present invention.

In FIG. 1, a portion of an outboard motor steering system 10 is shown attached to an outboard motor 12. The motor 12 is attached to the boat transom 11 with a conventional mounting bracket 9. The mounting bracket 9 includes a tilt tube 8 which is a horizontal pivot by which the motor is attached to the mounting bracket and about which the motor may be tilted out of the water. A steering arm 13 extends forwardly from the motor 12 and over the transom for operative connection to the steering system 10. The tilt tube 8 also functions as a guide tube 15 for the steering system 10.

The steering system per se is not a part of the subject invention and a full and complete description of its operation is unnecessary for a proper understanding of the invention. However, a brief description of one aspect of the steering system operation, which directly involves the linkage on which the connector of the subject invention is used, will be described briefly. In a so-called "push-pull" cable steering system of the type illustrated, operator movement of the steering wheel (not shown) imparts an axial push or pull movement to a steering cable 14 which is slidable axially in the guide tube 15. An output ram 16 extends axially from the opposite end of the guide tube 15 and the output ram may be an integral extension of the cable 14 or operate as a result of internal hydraulic forces. Relative axial movement of the output ram 16 with respect to the guide tube 15 will impart corresponding movement to the connected link rod 17 and, in turn, to the steering arm 13 attached to the other end of the link rod.

A similar steering mechanism may be utilized in a stern drive motor which, as is well-known, is attached to the outboard face of the transom and includes a steering arm which extends through the transom for connection to the steering system. The guide tube 15 in a stern drive embodiment, is attached to the inboard face of the transom. In other respects, particularly those relevant to the subject invention, the operation is essentially the same.

Figure 2:
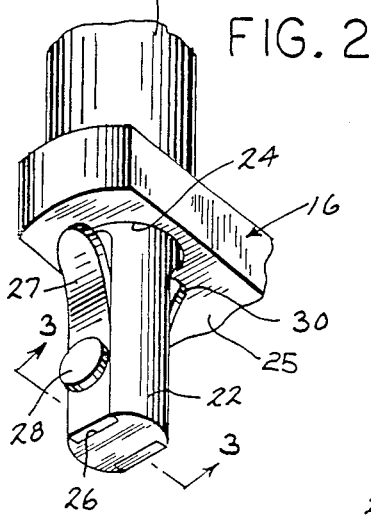
FIG. 2 is an enlarged perspective view of the connector assembly shown in FIG. 1.
Figure 3:
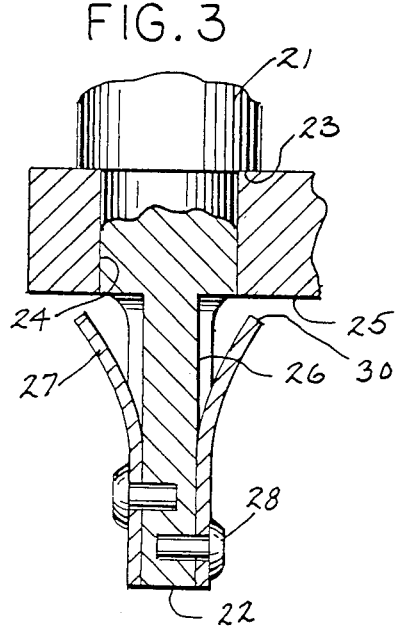
FIG. 3 is a cross section taken on line 3—3 of FIG. 2.
Figure 4:
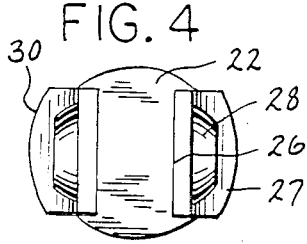
FIG. 4 is an axial end view of the link rod shown in FIG. 2.

The link rod 17 typically has a long main body portion 19 which terminates in an apertured end 20 by which it is attached to the steering arm 13 with a bolted or other type of connection. The opposite end portion 21 of the link rod comprises a short cylindrical section bent at a right angle to the main body 19. Referring also to FIGS. 2, 3 and 4, part of the end portion 21 of the link rod 17 is provided with a reduced diameter portion 22 defining an annular shoulder 23. The output ram 16 includes a flattened end 25 provided with an aperture 24 just slightly larger in diameter than the reduced diameter portion 22 of the link rod end 21.

The connection between the link rod 17 and the output ram 16 simply requires the axial insertion of the reduced diameter portion of the rod end 21 into and through the aperture 24. In the prior art, as indicated above, this connection was secured with a lock nut or similar device suitably threaded onto the reduced diameter portion 22. In the present invention, as may best be seen in FIGS. 2, 3 and 4, the reduced diameter portion 22 of the link rod end 21 is provided with a pair of diametrically opposite flats 26 which extend from the end of the rod to approximately the near face of the flattened end 25 of the attached output ram 16. A leaf spring 27 is attached by one of its ends to the end of a flat 26, as with a rivet 28 or other suitable fastener. The leaf spring which extends axially along the rod end 21 is bent in an arc to diverge radially from the rod axis and terminates in a free opposite end 30 immediately adjacent the near face of the flattened end 25 of the output ram 16.

With the output ram 16 and link rod 17 interconnected, the flattened end 25 of the output ram is loosely retained between the annular shoulder 23 and the free ends 30 of the leaf springs 27. The flats 26 and attached spring 27 are preferably positioned to insure that the free ends 30 will have a substantial surface against which to bear. Orienting the flats such that they are aligned with the axis of the main body 19 of the link rod 17, as shown, will help assure an adequate bearing surface. The leaf springs do not carry a significant load and the loose joint allows the necessary relative rotational movement between the interconnected parts.

The length and thickness of the leaf spring material are selected to allow the springs to be manually flexed (as with moderate thumb and finger pressure) toward one another and into the recessed flats 26. In this position, the linked rod end 21 may be withdrawn axially through the aperture 24 for convenient disassembly. Reassembly requires only the imposition of a moderate force in the opposite axial direction sufficient to cause the leaf springs to deflect radially toward the axis of the rod end 21 (and toward one another) as a result of the bearing force imposed on the leaf springs by the wall defining the aperture 24. The leaf springs will be forced into the recessed flats 26 until the free ends 30 thereof have cleared the face of the flattened end 25 of the output ram, whereupon they will snap outwardly and assume the retaining position shown.

A single leaf spring 27 would be sufficient to provide the desired connection. However, the use of two springs provides a back-up should one become inoperative. Other types of spring biased retainers might also be used, such as oppositely extending spring-loaded buttons. The retainer of the preferred embodiment, however, is simple in construction and reliable in operation.

Figure 5:
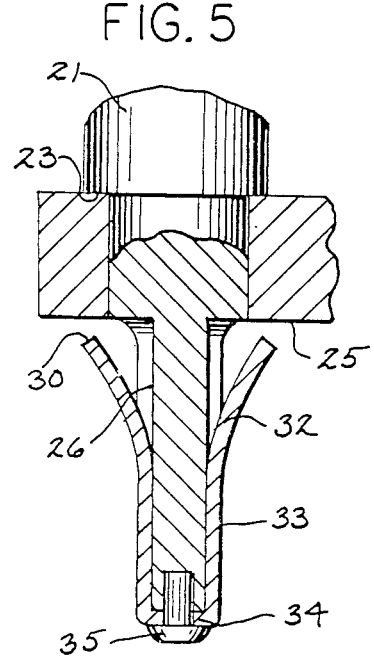
FIG. 5 is a cross section similar to FIG. 3 showing an alternate embodiment of the invention.

In an alternate embodiment shown in FIG. 5, the overall connector assembly is identical except for the configuration of the leaf springs. In this construction, each of the leaf springs 32 comprises a leg of a unitary U-shaped spring piece 33, which includes an integral cross piece 34 joining the leaf springs 32 at their fixed ends. The leaf springs may be substantially flat, but bent to a suitable angle at their juncture with the crosspiece 34 to provide the necessary divergence between their flexible free ends to create a retention similar to the leaf springs of the preferred embodiment. The unitary cross piece 34 is suitably attached to the flt end of the link rod with a drive screw 35 or the like. Assembly and disassembly of the FIG. 5 connector is identical to that of the preferred embodiment shown in FIGS. 2 and 3.

The invention has been shown and described with particular reference to the steering system for a outboard motor drive. However, as previously mentioned, essentially the same assembly may be used on stern drive steering assembly. Clearly, the readily demountable connector assembly of the present invention has more utility when used on an outboard motor steering system simply because an outboard motor is more often removed and reinstalled, requiring disassembly and reassembly of the linkage for which the connector of the present invention is particularly adapted.

Various modes of carrying out the present invention are contemplated as being within the scope of the following claims particularly pointing out and distinctly claiming the subject matter which is regarded as the invention.

I claim:

1. A connector for demountably retaining the end of a link rod for a marine drive steering system within an aperture in a steering output ram for relative rotation therein, the rod end extending through the aperture in the output ram and having a reduced diameter portion defining an annular shoulder aperture, said connector comprising:
    (a) manually flexible retaining means having a fixed end attached to the end of the link rod and a free opposite end extending along the rod toward the output ram and radially away from the rod such that said free end bears against the other face of the output ram adjacent the aperture to positively prevent axial withdrawal of the rod end from the aperture; and,
    (b) recess means in the rod end extending along and parallel to the surface thereof for attachment of the fixed end of the retaining means and receipt of the free end of the retaining means, and the retaining means must be manually squeezed into the recess means and flexed radially toward the rod, before the rod may be withdrawn axially from the aperture.

2. A connector as defined in claim 1 wherein the flexible retaining means comprises a pair of leaf springs attached to diametrically opposite sides of the rod end.

3. A connector as defined in claim 2 wherein the recess means comprises a flat surface for and coextensive with each leaf spring.

4. A connector for demountably retaining the cylindrical end of a link rod for a marine drive steering system within an aperture in the end of a steering output ram link for relative rotation therein, said connector comprising:

(a) a reduced diameter portion on the end of the link rod extending through the aperture and defining an annular shoulder adapted to bear against the face of the ram link farthest from the end of the rod;

(b) recessed flats on diametrically opposite sides of the end of the link rod, said flats extending axially of the rod and terminating adjacent the face of the ram link nearest the rod end;

(c) a manually flexible leaf spring for each flat attached at one end to the end of the rod and having a free opposite end such that the spring extends along and parallel to the rod toward the ram link and the free end diverges radially away from the rod to bear against the near face of the ram link and positively prevent axial withdrawal of the rod end from the aperture; and, (d) said free end of each leaf spring adapted to be manually flexed radially toward and against its respective flat such that the rod end with the leaf springs flexed against the flats may be withdrawn axially from the aperture.

5. A connector as defined in claim 4 wherein the leaf springs comprise the legs of a unitary U-shaped spring piece.

6. A connector as defined in claim 5 wherein the U-shaped spring piece is centrally attached to the rod end with a fastener disposed on the axis thereof.

7. A connector assembly for demountably retaining the end of a link rod for a marine drive steering system within an aperture in the end of a steering output ram link for relative rotation therein, said connector assembly comprising:

(a) shoulder means on the link rod spaced axially from the end thereof and adapted to bear against the face of the ram link farthest from the end of the rod as the rod end is inserted axially through the aperture;

(b) spring-biased detent means on the end of the rod adapted to bear against the wall of the aperture and deflect radially toward the rod as the rod end is inserted axially through the aperture and to deflect radially away from the rod and engage the face of the ram link nearest the end of the rod as the detent means passes through the aperture to positively retain the link rod therein and prevent axial withdrawal; and, (c) the detent means must be manually flexed by squeezing the same radially against the rod end and out of engagement with the face of the ram link before axial withdrawal of the rod end from the aperture.

8. A connector assembly as defined in claim 7 wherein the detent means comprises a pair of leaf springs attached by their ends to the end of the link rod and having free opposite ends extending along and parallel to the rod and diverging radially therefrom to engage the face of the ram link in the retaining position.

* * * * *

UNITED STATES PATENT AND TRADEMARK OFFICE
CERTIFICATE OF CORRECTION

PATENT NO. : 4,843,990

DATED : July 4, 1989

INVENTOR(S) : Richard H. Snyder

It is certified that error appears in the above-identified patent and that said Letters Patent is hereby corrected as shown below:

Claim 1, column 4, line 40, after "shoulder" insert
--adapted to bear against one face of the
output ram adjacent the--.

Claim 1, column 4, line 53, delete "," after "means".

Signed and Sealed this

Second Day of April, 1991

Attest:

HARRY F. MANBECK, JR.

*Attesting Officer*     *Commissioner of Patents and Trademarks*